United States Patent
Douady et al.

(10) Patent No.: US 8,031,730 B2
(45) Date of Patent: Oct. 4, 2011

(54) SYSTEM AND METHOD FOR TRANSMITTING A SEQUENCE OF MESSAGES IN AN INTERCONNECTION NETWORK

(75) Inventors: César Douady, Orsay (FR); Philippe Boucard, Le Chesnay (FR)

(73) Assignee: Arteris, Guyancourt (FR)

( * ) Notice: Subject to any disclaimer, the term of this patent is extended or adjusted under 35 U.S.C. 154(b) by 1628 days.

(21) Appl. No.: 10/988,831

(22) Filed: Nov. 15, 2004

(65) Prior Publication Data

US 2005/0141505 A1 Jun. 30, 2005

(30) Foreign Application Priority Data

Nov. 13, 2003 (FR) ..................................... 03 13298

(51) Int. Cl.
*H04L 12/56* (2006.01)
(52) U.S. Cl. ......... 370/414; 370/416; 370/418; 370/423
(58) Field of Classification Search .................. 370/443, 370/322, 341, 414, 416, 418
See application file for complete search history.

(56) References Cited

U.S. PATENT DOCUMENTS

| | | | |
|---|---|---|---|
| 4,099,234 A * | 7/1978 | Woods et al. .................... 714/11 |
| 4,797,880 A * | 1/1989 | Bussey et al. .................. 370/411 |
| 5,025,370 A * | 6/1991 | Koegel et al. .................. 710/241 |
| 5,651,002 A | 7/1997 | Van Seters et al. |
| 5,805,320 A * | 9/1998 | Kuroyanagi et al. ........... 398/56 |
| 6,400,720 B1 | 6/2002 | Ovadia et al. |
| 6,707,818 B1 * | 3/2004 | Kadambi et al. ............... 370/391 |
| 7,027,461 B1 * | 4/2006 | Bontempi ....................... 370/443 |
| 7,103,053 B2 * | 9/2006 | Malalur et al. ................. 370/401 |
| 7,310,332 B2 * | 12/2007 | Kadambi et al. ............... 370/360 |
| 7,433,948 B2 * | 10/2008 | Edsall et al. ................... 709/224 |
| 7,457,902 B2 * | 11/2008 | Yang et al. ..................... 710/200 |
| 7,675,924 B2 * | 3/2010 | Malalur et al. ................. 370/401 |
| 2001/0036185 A1 * | 11/2001 | Dempo ........................ 370/392 |
| 2002/0085582 A1 | 7/2002 | Kim |
| 2002/0196785 A1 | 12/2002 | Connor |
| 2004/0017820 A1 | 1/2004 | Garinger et al. |
| 2005/0034049 A1 * | 2/2005 | Nemawarkar et al. ........ 714/758 |
| 2005/0078666 A1 * | 4/2005 | Beshai .......................... 370/380 |

FOREIGN PATENT DOCUMENTS

| | | |
|---|---|---|
| EP | 1061695 | 12/2000 |
| EP | 1182819 | 2/2002 |
| EP | 1206077 | 5/2002 |

OTHER PUBLICATIONS

Virtual networks in the cellular domain; G Söderström—2003.*

(Continued)

*Primary Examiner* — Salman Ahmed
(74) *Attorney, Agent, or Firm* — Fish & Richardson P.C.

(57) ABSTRACT

Method for transmitting a sequence of messages in a point-to-point interconnection network comprising message initiating agents, message destination agents and message transmission agents. During a transmission of an indivisible sequence of messages from an initiating agent to a destination agent, an output of a message transmission agent is locked onto an input of the transmission agent, the other inputs of the said transmission agent being able to transmit messages to the other outputs of the said transmission agent.

10 Claims, 11 Drawing Sheets

OTHER PUBLICATIONS

Security features in Ethernet switches for access networks; Guruprasad, A.; Pandey, P.; Prashant, B.; TENCON 2003. Conference on Convergent Technologies for Asia-Pacific Region vol. 3 Digital Object Identifier: TENCON.2003.1273439 Publication Year: 2003.*

Guerrier et al., "A Generic Architecture for On-Chip Packet-Switched Interconnections", Mar. 2000, IEEE, pp. 250-254.

Rosenberg et al., "SIP: Session Initiation Protocol", Feb. 2002, *Internet Engineering Task Force*, 192 pages.

Rapport de Recherche Preliminaire for FR 0308225, Date d'achevement de la recherche Jul. 5, 2004, (1 page).

Rapport de Recherche Preliminaire for FR 0308905, date d'achevement de la recherché Dec. 23, 2003 (1 page).

Tamir et al., "High-performance multi-queue buffers for VLSI communication switches", Computer Architecture, 1988, Conference Proceedings, 15$^{th}$ Annual International Symposium, May 30, 1988-Jun. 2, 1988, pp. 343-354, XP002266011.

Kermani et al., "Virtual Cut-Through: A New Computer Communication Switching Technique", Computer Networks, North Holland, Amsterdam, NL, vol. 3, 1979, pp. 267-286, XP000814463, ISSN: 0376-5075.

http:www.cs.bu.edu/~best/crs/cs551/lectures/lecture-15.html, "Message Passing Architectures", Lesson 15, A. Bestavros, Nov. 1, 1994 (3 pages).

http://www.proj-mission.org/EE660/Gautam7.4.pdf "Message Passing Mechanisms" (3 pages).

Rapport de Recherche Preliminaire for French Application No. FR 0309918 date d'achevement de la recherché Apr. 6, 2004 (3 pages).

Yamaguchi et al. "CODA-R: a reconfigurable testbed for real-time parallel computation", Real-Time Computing Systems and Applications, 1997, Proceedings, Fourth International Workshop on Taipei, Taiwan Oct. 27-29, 1997, Los Alamitos, CA, USA, IEEE Comput. Soc., U.S., Oct. 27, 1997, pp. 252-259, XPO10251835, ISBN: 0-8186-8073-3.

Toda et al., "A priority forwarding scheme for real-time multistage interconnection networks", Proceedings of the Real Time Systems Symposium, Phoenix, Dec. 2-4, 1992, Los Alamitos, IEEE Comp. Soc. Press, U.S. Dec. 2, 1992, pp. 208-217, XP010031283, ISBN: 0-8186-3195-3.

Toda et al., "Implementation of a priority forwarding router chip for real-time interconnection networks", Parallel and Distributed Real-Time Systems, 1994, Proceedings of the Second Workshop on Cancun, Mexico, Apr. 28-29, 1994, Los Alamitos, CA, USA, IEEE Comput. Soc. Apr. 28, 1994, pp. 166-175, XP010125212, ISBN: 0-8186-6420-7.

Rapport de Recherche Preliminaire for FR 0400554, date d'achevement de la recherché Sep. 29, 2004 (3 pages).

Rapport de Recherche Preliminaire for FR 0402149, date d'achevement de la recherché Sep. 22, 2004 (3 pages).

Benini et al., "Networks on Chips: A New SoC Paradigm", Computer, IEEE Computer Society, Long Beach, CA, US, vol. 35, No. 1, Jan. 2002, pp. 70-78, XP001091890, ISSN: 0018-9162.

Liu et al., "Error control schemes for networks: An overview", Mobile Networks and Applications, vol. 2, No. 2, Oct. 1997, pp. 167-182, XP002296032, Kluwer Academic Publishers, Hingham, MA, USA.

Rapport de Recherche Preliminaire for French Application No. FR 0313298 date d'achevement de la recherché Jul. 20, 1994 (2 pages).

U.S. Appl. No. 10/884,794 to Douady et al., entitled "System and Method for Communicating Between Modules", filed Jul. 2, 2004.

U.S. Appl. No. 10/892,815 to Douady et al., entitled "Device and Method for Forwarding a Message", filed Jul. 16, 2004.

U.S. Appl. No. 10/915,950 to Douady et al., entitled "Method and Device for Managing Priority During the Transmission of a Message", filed Aug. 11, 2004.

U.S. Appl. No. 11/039,112 to Douady et al., entitled "Method and System for Transmitting Messages in an Interconnection Network", filed Jan. 19, 2005.

U.S. Appl. No. 11/054,179 to Douady et al., entitled "Method and Device for Switching Between Agents", filed Feb. 9, 2005.

* cited by examiner

SYSTEM AND METHOD FOR TRANSMITTING A SEQUENCE OF MESSAGES IN AN INTERCONNECTION NETWORK

BACKGROUND OF THE INVENTION

1. Field of the Invention

The present invention relates to a method and a device for transmitting a sequence of messages in a point-to-point interconnection network.

2. Description of the Relevant Art

Interconnection networks are means of transmitting messages between different electronic or data processing agents, or communicating entities. A transmission can be carried out without processing the message or with processing the message. The expression "message transmission" is used in all cases. The expression "processing a message" is understood to be, for example, an analysis of data contained in the message or an addition of data to the message.

A message is, of course, a series of information technology data, that is to say a series of bits or bytes arranged with specific semantics and representing a complete item of atomic information. Each message comprises a message header, which principally comprises the destination address of the message and the size of the message.

These interconnection networks are generally composed of two separate parts which interact, namely a hardware part comprising physical links and a hard-wired or micro-programmed network controller, which executes a low level protocol, and a software part for forming an interface with software functions of higher level.

An ideal interconnection network would certainly be a totally interconnected network, that is to say a network in which each pair of agents is connected by a point-to-point link. This is unrealistic however as it becomes too complicated as soon as there are more than a few dozen agents. It is therefore desirable that the interconnection network can provide all of the communications between agents with a limited number of links per agent.

There are specialized agents for performing a routing or switching or transmission of the messages circulating in the interconnection network.

In a point-to-point interconnection network, an agent's input is connected to at most one message initiating agent, or to at most one message transmission agent.

Interconnection networks comprise transmission devices or routers (or "switches"), an organization of the network providing the link between the routers and the other agents and a routing assembly which provides the circulation of messages within the organization of the network.

A router is an active agent of the interconnection network which receives on input messages coming from one or more agents and which directs or routes each of these messages to its destination agent or to another router respectively. This routing is carried out by means of the address of the destination agent of the message, or target agent, which is present in the header of the message to be routed.

The organization of a network constitutes the physical structure connecting the various nodes or connection points of an interconnection network.

The routing assembly manages the way in which a message is routed or directed from a source agent transmitting the message to a destination agent of the message through routers by following a routing path.

Any agent present in an interconnection network can transmit and/or receive messages. The routing technique determines the way in which the messages are transmitted from the transmission agent, which creates the message, to the destination agent or target agent. For a given interconnection network, there are different routing techniques, for which the objectives are to reduce the end of message latency, or end of message routing delay, of a message from the transmission agent to the destination agent, to increase the overall throughput and to improve the overall reliability of the network. The latency includes all of the waiting times due to the way in which the messages propagate in the network and, more particularly, through the message transmission devices whose task is to route the messages. The throughput is the quantity of computer data that a link of the network can convey per unit time, and can be measured locally on a link of the interconnection network or globally over the whole of the interconnection network. The reliability of a network is important, since the probability of errors grows rapidly with the number of nodes in an interconnection network.

A transmission agent comprises at least one input comprising a storage means organized as queue of messages of the "First In First Out" (FIFO) type and at least one output comprising a message transmission means capable of deciding which message to transmit. Only the first messages of the input queues are visible to the transmission agent.

Many software applications necessitate the accessing of identical data. For example, it is not necessary, when an application modifies an item of data and when another application or the same application necessitates accessing the modified value of that item of data, for it to access it before the end of its modification. Solutions have been developed to ensure this and they are generally based on the concept of a set of atomic actions, or a set of indivisible actions, in other words on a series of actions that cannot be interrupted by other actions.

An atomic transaction of the read-modify-write type is an indivisible sequence consisting of a step of reading data at a particular address of a target agent, followed by a step of actions modifying the data and then by a writing at the initial address of the new values of the modified data. These special transactions prohibit modifications in parallel of the same item of data. It is the hardware part of the system which directly manages these types of transactions. Current atomic transactions of this type are generally increments, decrements, initializations or deletions.

There are also transactions carried out on locked data busses and based on the use of a bus locking signal. This locking signal acts directly on the transmission or switching or decision means of the data bus in such a way that as long as the locking signal is valid, only the transmission agent of that locking message can transmit messages on the data bus and act on data, which guarantees the atomicity of the processing in progress. When the bus is locked, only messages arriving at the input connected to the initiating agent can be transmitted on the output allowing the messages to be transmitted to the destination agent.

In an interconnection network, it is not possible to guarantee, by construction, the atomicity of a complete transaction since a transmission agent can interlace messages coming from several initiating agents and destined for a same destination agent, thus breaking the atomicity of the first transaction in the process of switching or transmission or routing.

In the light of the above, it is also an objective of the invention to guarantee the atomicity of an original sequence of messages from a transmission agent destined for a target agent. In other words, it is a matter of transmitting an indivisible sequence of messages, from an initiating agent to a destination agent, whilst locking only one output onto an input for the transmission agents located in the path of the messages of the indivisible sequence.

SUMMARY OF THE INVENTION

Thus, according to one aspect of the invention, there is proposed a method for transmitting a sequence of messages in a point-to-point interconnection network comprising messagе initiating agents, message destination agents and message transmission agents. During a transmission of an indivisible sequence of messages from an initiating agent to a destination agent, an output of a message transmission agent is locked onto an input of the transmission agent. The other inputs of the said transmission agent can transmit messages to the other outputs of the said transmission agent.

In other words, there is transmitted, momentarily, only the messages arriving on a specified input, coming from an initiating agent, to a specific output, which constitutes the locking of an output onto an input.

In a first preferred implementation, an indivisible sequence of messages generated by an initiating agent and destined for a destination agent starts with a locking message comprising an address identifying the destination agent, and an operation code containing the information that the sequence is indivisible.

For example, the said operation code being interpreted as a locking is also interpreted as a command. This makes it possible to optimize the use of the bandwidth.

In an advantageous implementation, the locking message propagates, to the successive transmission agents between the initiating agent and the destination agent, a locking of a specified output of each of the said successive transmission agents onto the input through which the locking message has arrived.

Furthermore, the messages of the said indivisible sequence of messages following the locking message are transmitted by the successive transmission agents through a path that is therefore locked, a message coming from another initiating agent not being able to be inserted in the said indivisible sequence of messages.

In an advantageous implementation, the said indivisible sequence of messages is terminated by an unlocking message comprising an address identifying the destination element and an operation code interpreted as an unlocking code.

In a preferred implementation, the unlocking message propagates, to the successive transmission agents between the initiating agent and the destination agent, an unlocking of the successive outputs locked onto their respective input.

Furthermore, the said operation code interpreted as an unlocking is interpreted as a command.

Furthermore, the said locking message also comprises the number of messages in the indivisible sequence of messages.

In this case, it is useless to terminate the indivisible sequence of messages by an unlocking message.

In a second preferred implementation, each message of an indivisible sequence of messages generated by an initiating agent and destined for a destination agent comprises information indicating that it is linked in an indivisible manner with the following message, the first message in the said sequence furthermore comprising an address identifying the destination agent.

Furthermore, there is locked, on the successive transmission agents between the initiating agent and the destination agent, a specified output of each of the said successive transmission agents onto the input through which has arrived the first message of the indivisible sequence comprising information that it is linked in an indivisible manner with the following message. The following messages of the indivisible sequence are transmitted, through the locked path, and the said locked outputs are unlocked on transmission of the last message of the indivisible sequence, which contains information indicating that it is not linked in an indivisible manner with the following message.

According to another aspect of the invention, there is also proposed a system for transmitting a sequence of messages in a point-to-point interconnection network comprising message initiating agents, message destination agents and message transmission agents. The system comprises a transmission agent which comprises at least one output comprising a means of authorization capable of locking the said output onto an input of the transmission agent. The other inputs of the said transmission agent can transmit messages to the other outputs of the said transmission agent. The authorization means is furthermore capable of unlocking the said locked output.

BRIEF DESCRIPTION OF THE DRAWINGS

Other purposes, characteristics and advantages of the invention will appear on reading the following description, given as a non-limiting example and with reference to the appended drawings in which.

Figure 1:
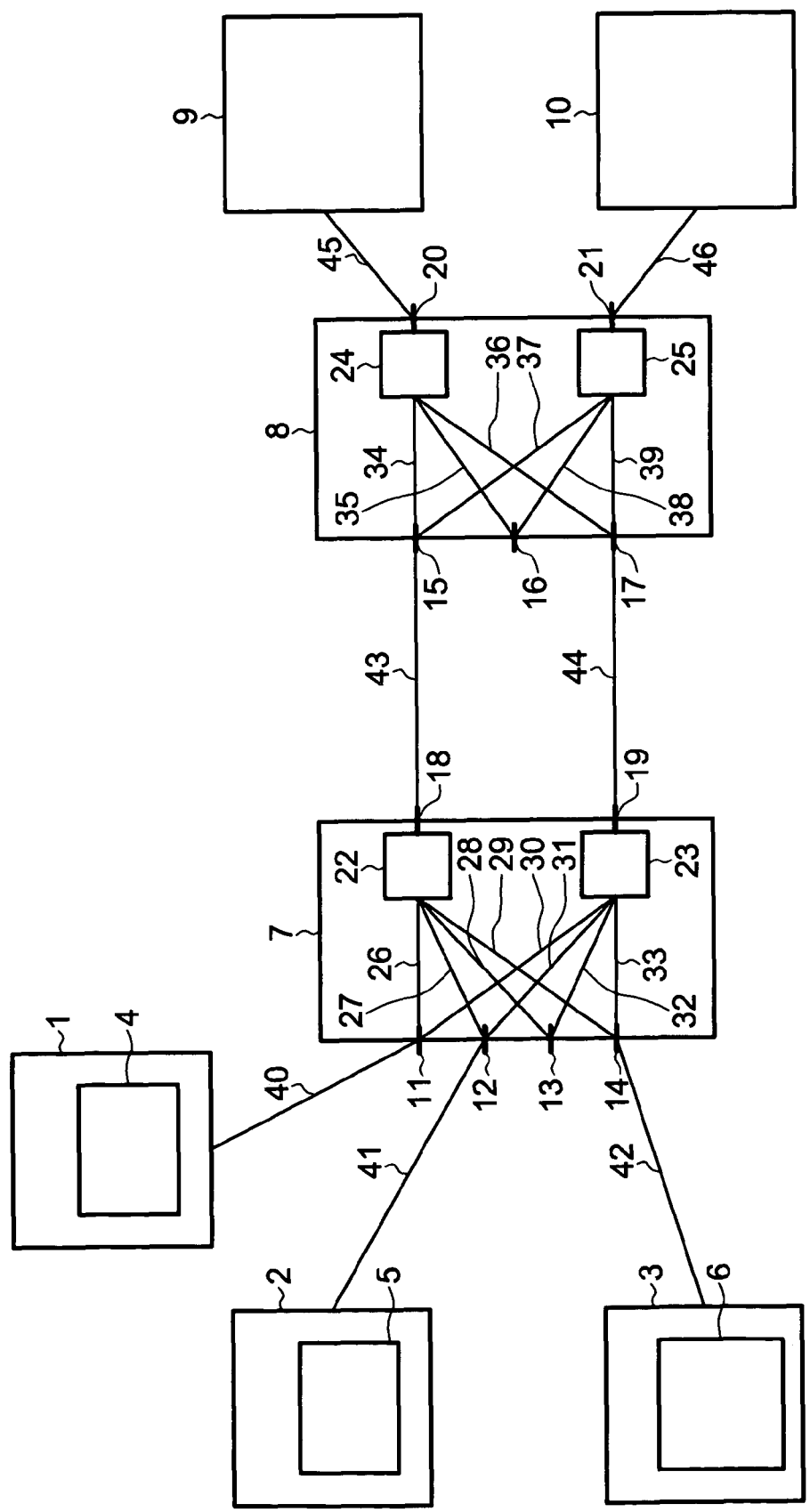
FIG. 1 is a block diagram of an embodiment of a system according to the invention.

While the invention is susceptible to various modifications and alternative forms, specific embodiments thereof are shown by way of example in the drawings and will herein be described in detail. It should be understood, however, that the drawing and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

FIG. 1 shows an interconnection system which comprises three message initiating agents 1, 2, 3, comprising a means of creation, 4, 5 and 6 respectively, capable of generating a sequence of messages that is or is not indivisible. An initiating agent is for example a central processing unit (CPU), or an external interface. The system furthermore comprises two transmission agents or routers 7, 8, and two destination agents 9 and 10. A destination agent is, for example, a video screen (LCD), or a Synchronous Dynamic Random Access Memory (SDRAM). The number of each of these agents can obviously be any number whatsoever.

In this example, the transmission agent 7 comprises four inputs 11, 12, 13, 14 and the transmission agent 8 comprises three inputs 15, 16, 17. Each input of an agent of a point-to-point interconnection system is connected to at most one other agent of the point-to-point interconnection system. The transmission agent 7 furthermore comprises two outputs 18 and 19, and the transmission agent 8 comprises two outputs 20 and 21. In this example, each output 18, 19, 20, 21 of the transmission agents 7, 8 respectively comprises an authorization module 22, 23, 24, 25 capable of locking an output of the respective agent onto an input of the respective agent. "Locking an output onto an input" is understood to mean that only messages arriving on an input are allowed to be transmitted on an output. This locking makes it possible to transmit an indivisible sequence of messages from an initiating agent to a destination agent. Of course when an output is unlocked or not locked onto an input, the transmission behaviour is a conventional behaviour. The outputs 18, 19, 20, 21 of the transmission agents 7, 8 are connected to at least one of the inputs of their respective transmission agent. The output 18 of the transmission agent 7 is respectively connected by means of one of the connections 26, 27, 28, 29 to the inputs 11, 12, 13, 14, and the output 19 of the transmission agent 7 is respectively connected by at least one of the connections 30, 31, 32, 33 to the inputs 11, 12, 13, 14. Similarly, in this example, the output 20 of the transmission agent 8 is respectively connected by at least one of the connections 34, 35, 36 to the inputs 15, 16, 17, and the output 21 of the transmission agent 8 is respectively connected by at least one of the connections 37, 38, 39 to the inputs 15, 16, 17.

The initiating agent 1 is connected to the input 11 of the transmission agent 7 by a connection 40, the initiating agent 2 is connected to the input 12 of the transmission agent 7 by a connection 41, and the initiating agent 3 is connected to the input 14 of the transmission agent 7 by a connection 42.

Furthermore, the outputs 18 and 19 of the transmission agent 7 are respectively connected to the inputs 15 and 17 of the transmission agent 8 by connections 43 and 44 having storage capabilities. The outputs 20 and 21 of the transmission agent 8 are respectively connected to the destination agents 9 and 10 by connections 45 and 46 having storage capabilities.

FIGS. 2 to 11 illustrate the functioning of the method according to the invention, implemented by a system according to FIG. 1.

Figure 2:
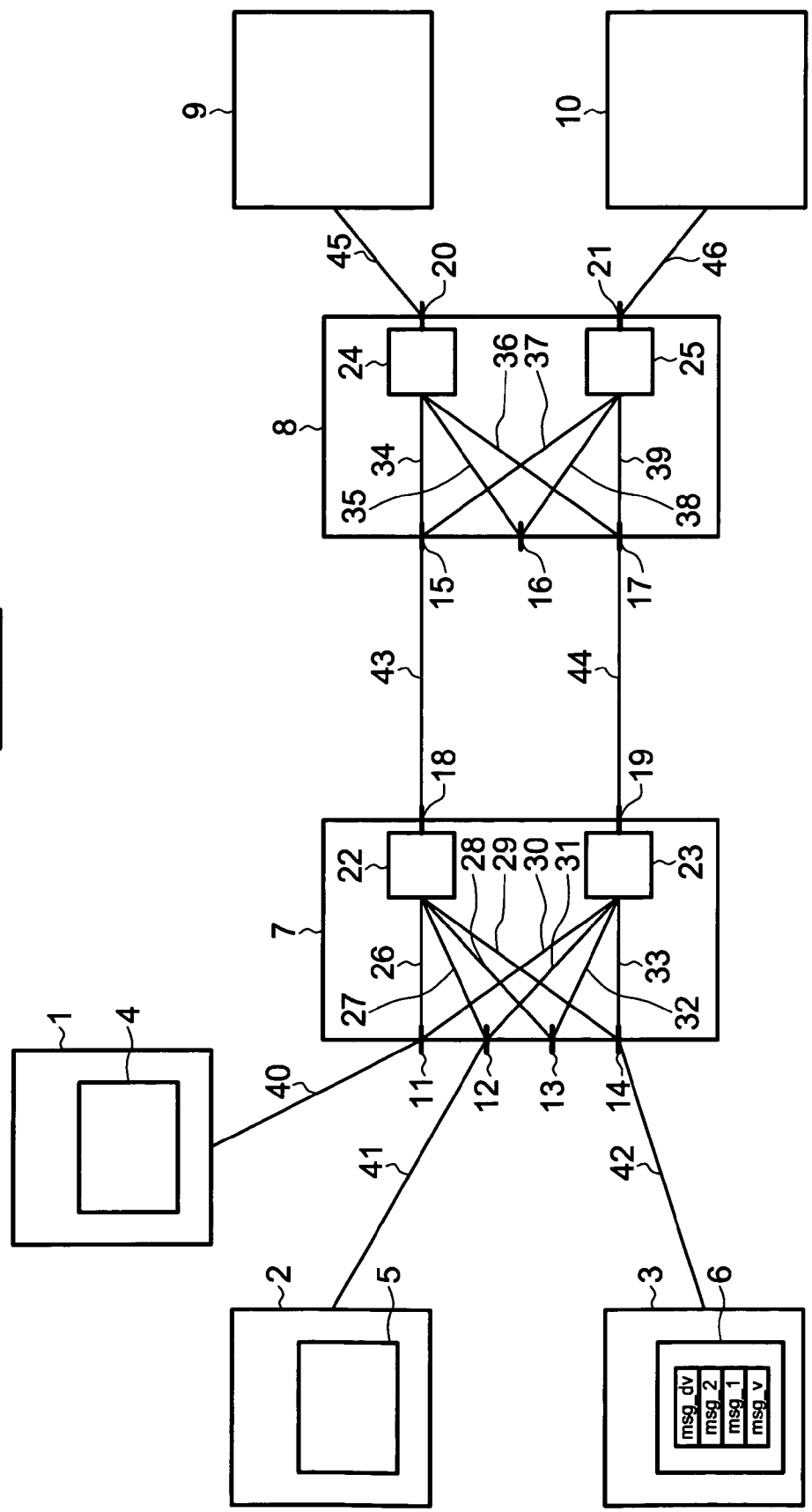
FIGS. 2 to 11 illustrate the steps of a method according to the invention implemented by a system according to FIG. 1.

FIG. 2 describes an indivisible sequence of messages created and stored by the creation means 6 of the initiating agent 3, for example comprising four messages: a locking message msg_v, followed by two commands messages msg_1 and msg_2, followed by an unlocking message msg_dv. This indivisible sequence is for example destined for the destination agent 10. The locking message msg_v comprises an address identifying the destination agent 10 and an operation code having the information that the sequence is indivisible. The unlocking message comprises an operation code which is interpreted as an unlocking.

Figure 3:
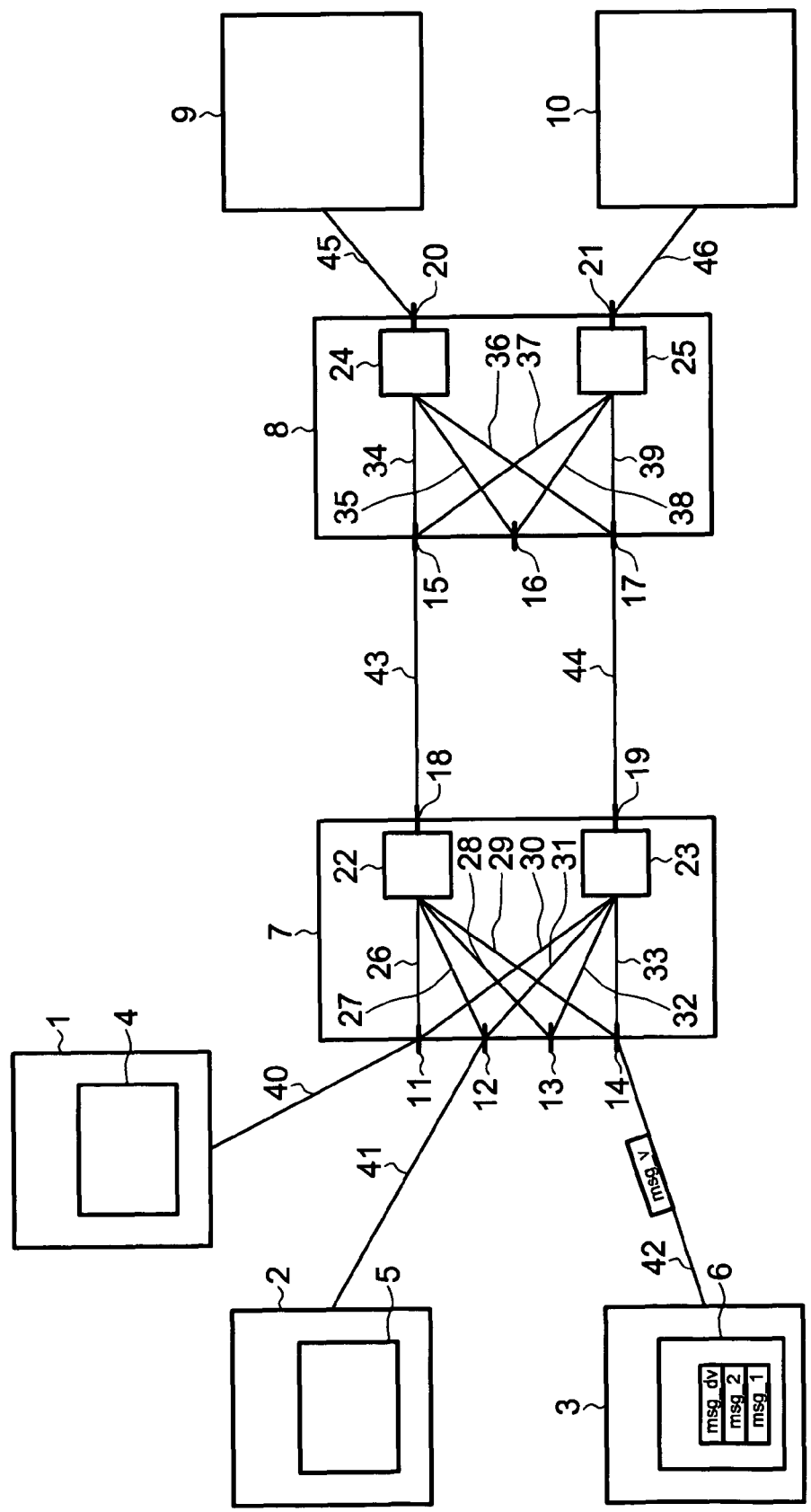

In FIG. 3, the locking message msg_v is transmitted by the connection 42 to the input 14 of the transmission agent 7.

Figure 4:
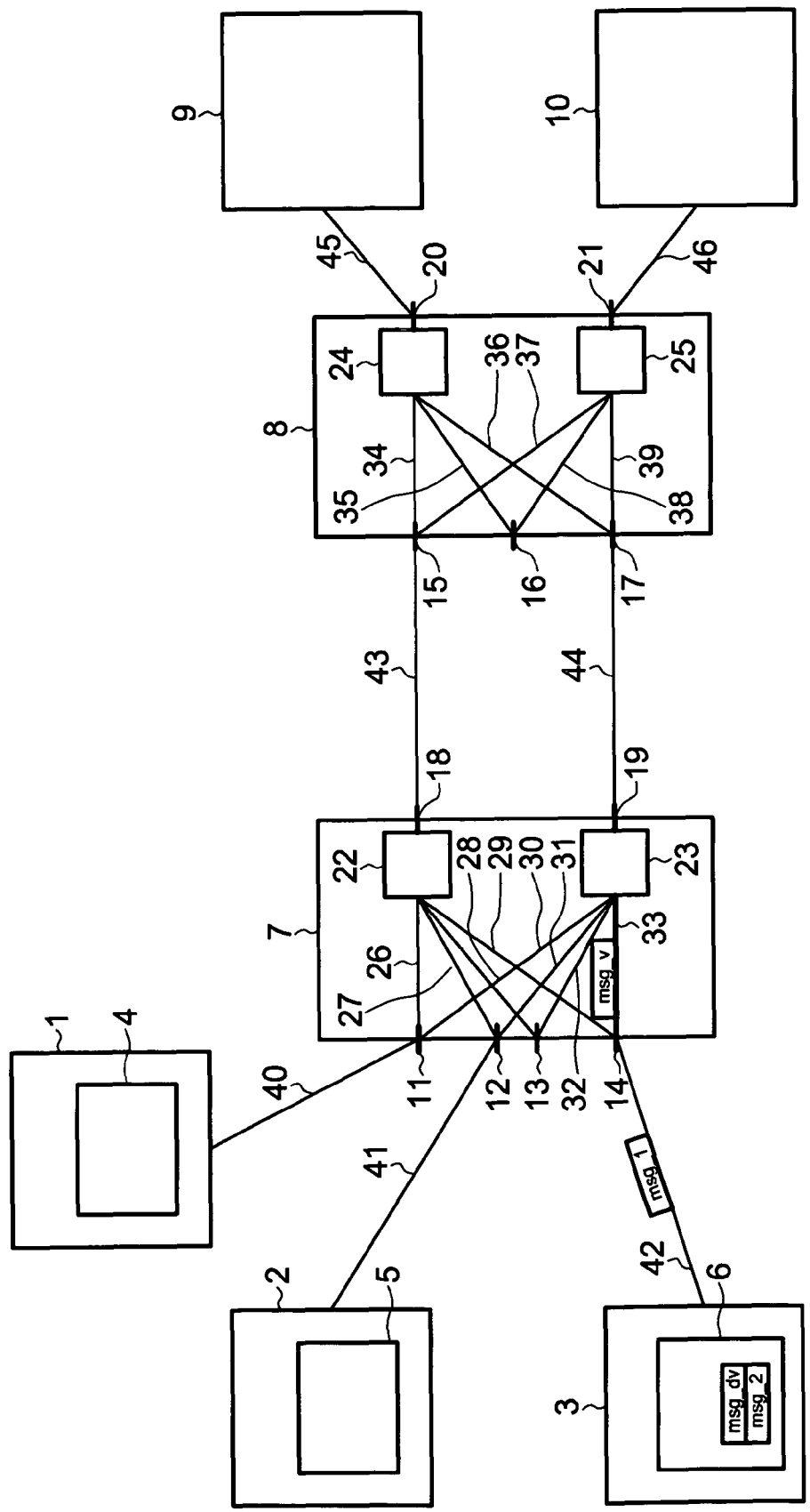

In FIG. 4, the authorization module 23 has selected the locking message msg_v for the connection 33 going to the output 19. The authorization module 23 recognizes the locking operation code and then locks the connection 33 for the output 19 or, in other words, locks the output 19 onto the input 14. Only the messages arriving on the input 14, in other words only messages coming from the initiating agent 3, will be able to be transmitted to the output 19 of the transmission means 7. The connection 33, the only one authorized to transmit messages to the output 19, is therefore represented by a thick line, signifying that the output 19 is locked onto the input 14. Furthermore, the first command message msg_1 is transmitted by the connection 42.

Figure 5:
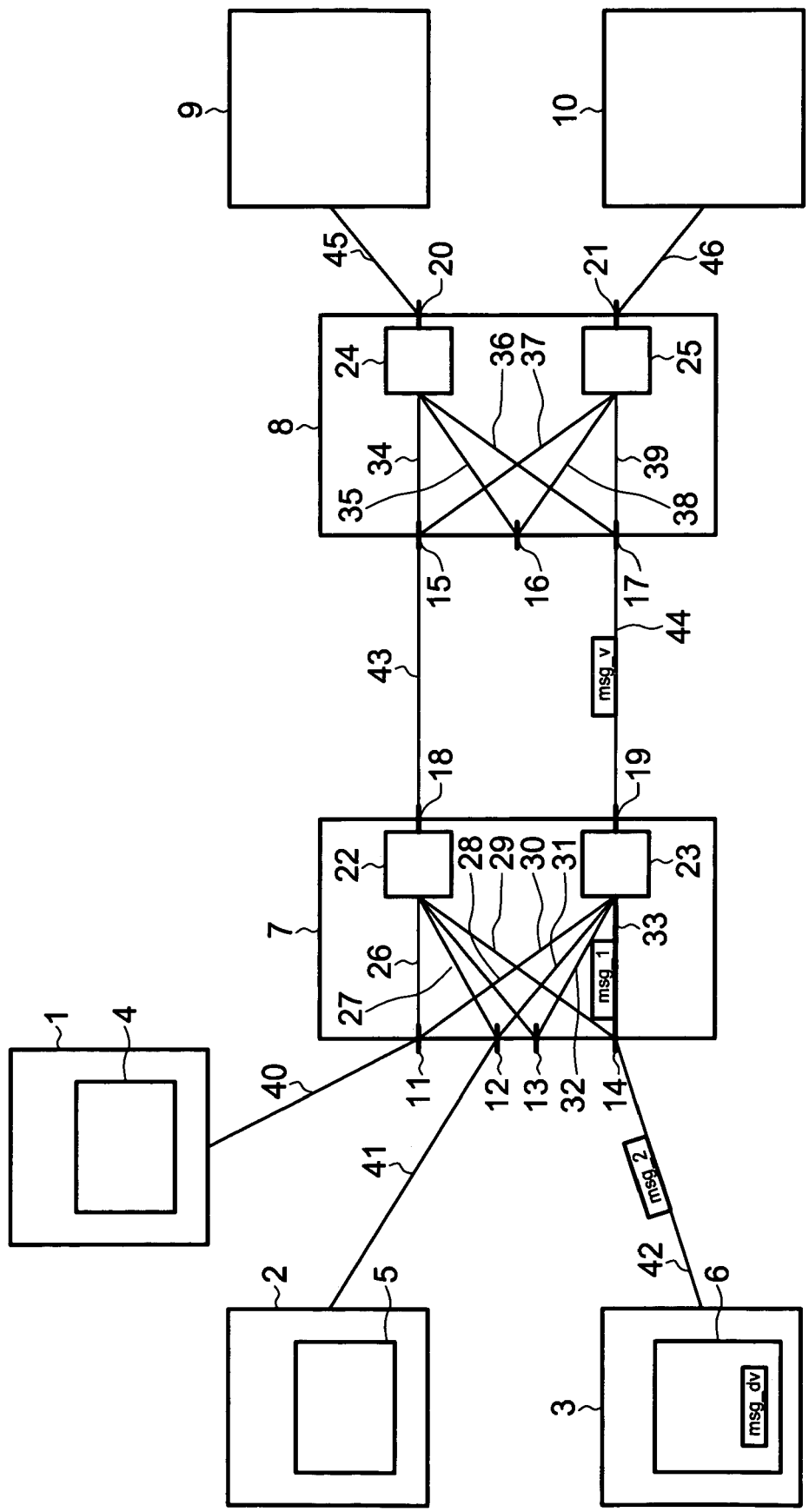

In FIG. 5, the locking message msg_v continues its transmission to the destination agent 10 through the connection 44 and arrives at the input 17 of the transmission agent 8. The connection 33 is still the only one authorized to transmit messages to the output 19, and furthermore transmits the first command message msg_1. In other words, the output 19 remains locked onto the input 14 of the transmission agent 7. Furthermore, the second command message msg_2 is transmitted by the connection 42 to the input 14 of the transmission agent 7, and the first command message is transmitted by the connection 33 to the output 19 of the transmission agent 7.

Figure 6:
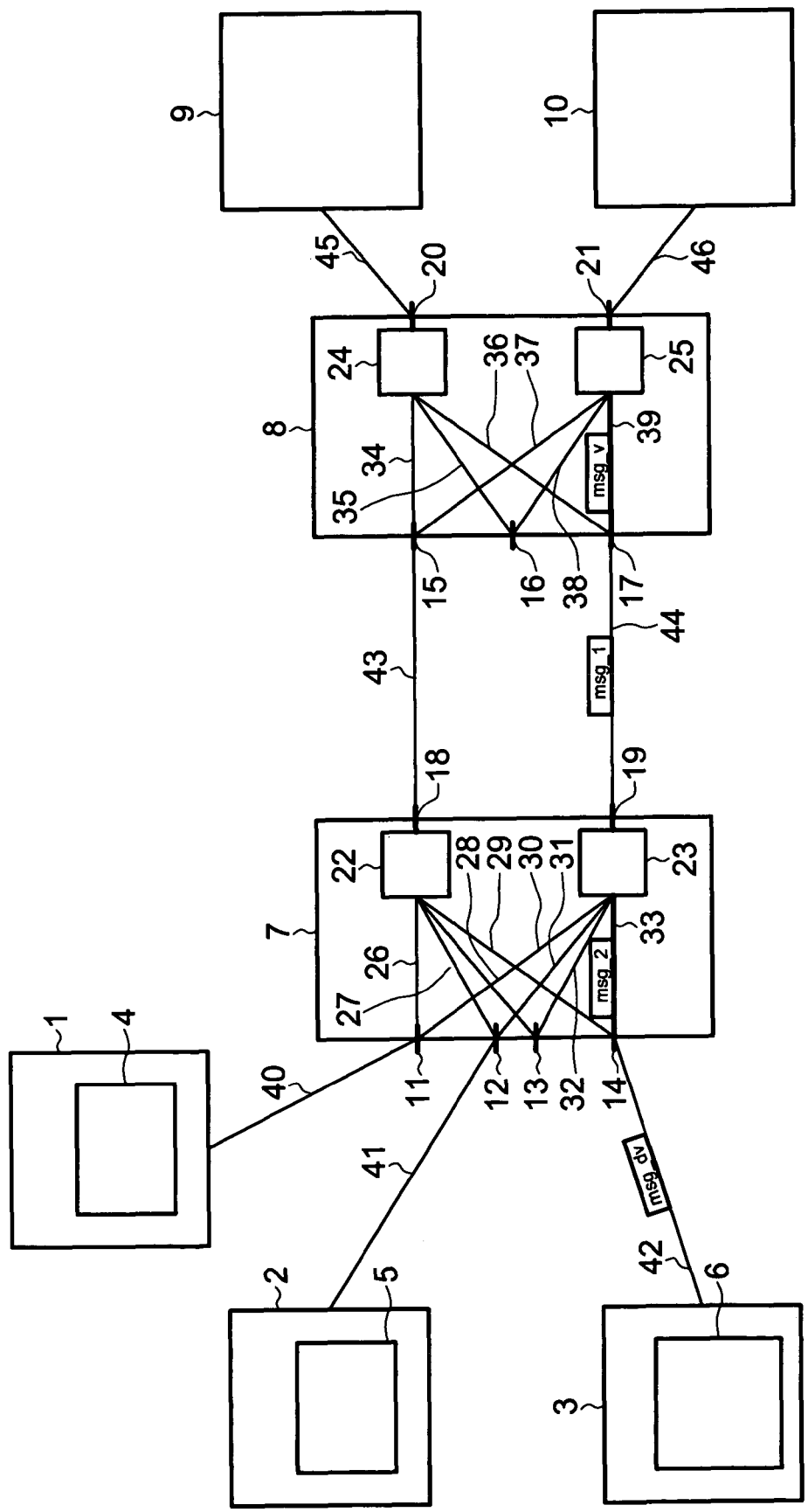

In FIG. 6, the authorization module 25 selects the locking message msg_v for the connection 39 going from the input 17 to the output 21 of the transmission agent 8. The authorization module 25 recognizes the locking operation code and locks the output 21 onto the input 17. Only messages arriving on the input 17, in other words only messages coming from the output 19 of the transmission agent 7, and therefore from the input 14, and therefore from the initiating agent 3, will be able to be transmitted to the output 21 of the transmission means 8. The connection 39, being the only one authorized to transmit messages to the output 21, is therefore represented by a thick line, signifying that the output 21 is locked onto the input 17. The output 19 is locked onto the input 14 and the connection 33 is the only one authorized to transmit messages to the output 19. Moreover the connection 33 transmits the second command message msg_2 to the output 19. Furthermore, the first command message msg_1 is transmitted by the connection 44 and the unlocking message msg_dv is transmitted by the connection 42 to the input 14 of the transmission agent 7.

Figure 7:
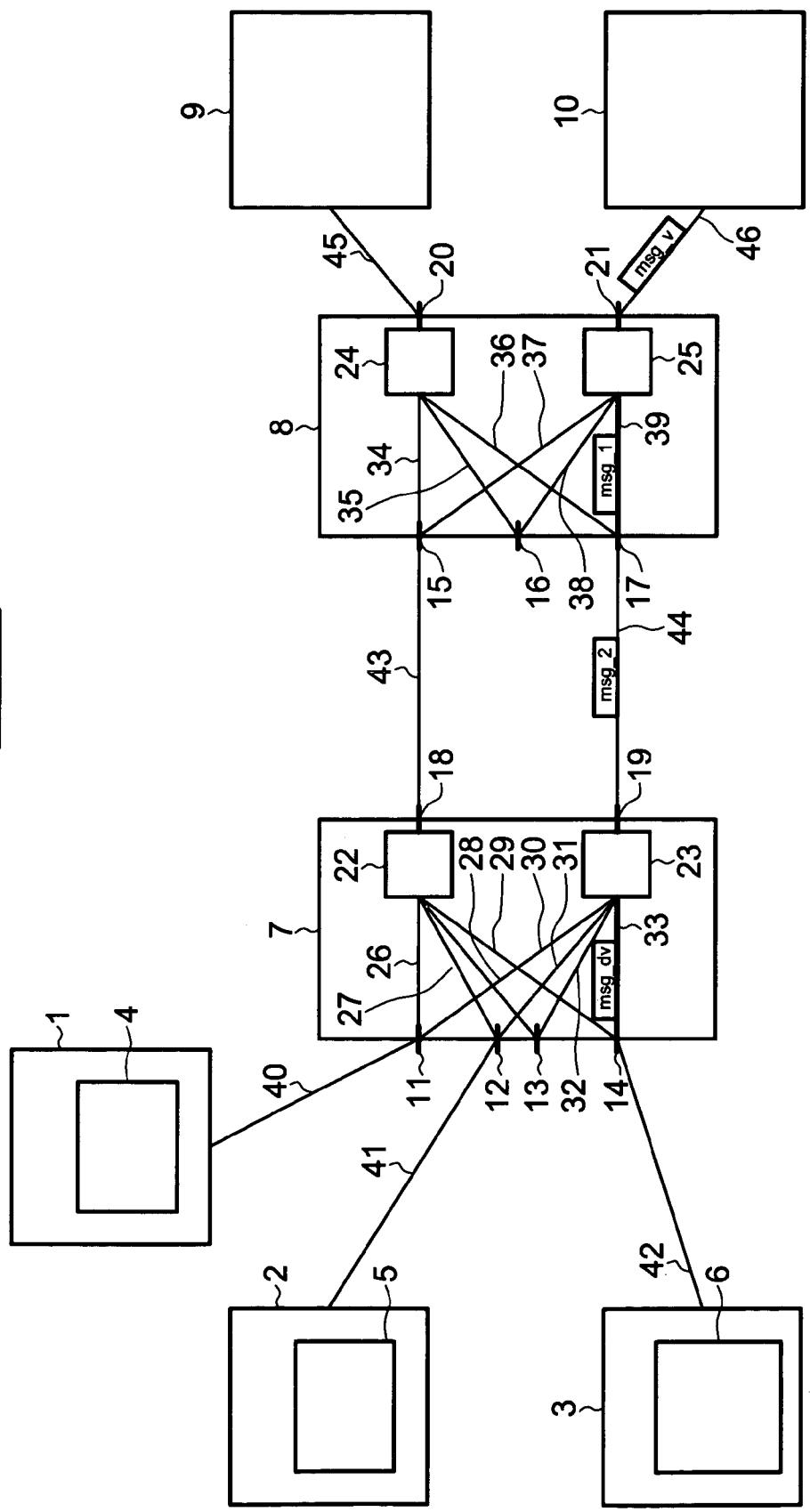

In FIG. 7, the authorization module 23 recognizes the unlocking operation code of the unlocking message msg_dv and then ends the locking of the output 19 onto the input 14. The input 14 and the output 19 therefore resume conventional functioning. The output 21 is locked onto the input 17 and transmits the first command message msg_1. Furthermore, the second command message msg_2 is transmitted by the connection 44 and the locking message msg_v is transmitted by the connection 46 to the destination agent 10.

Figure 8:
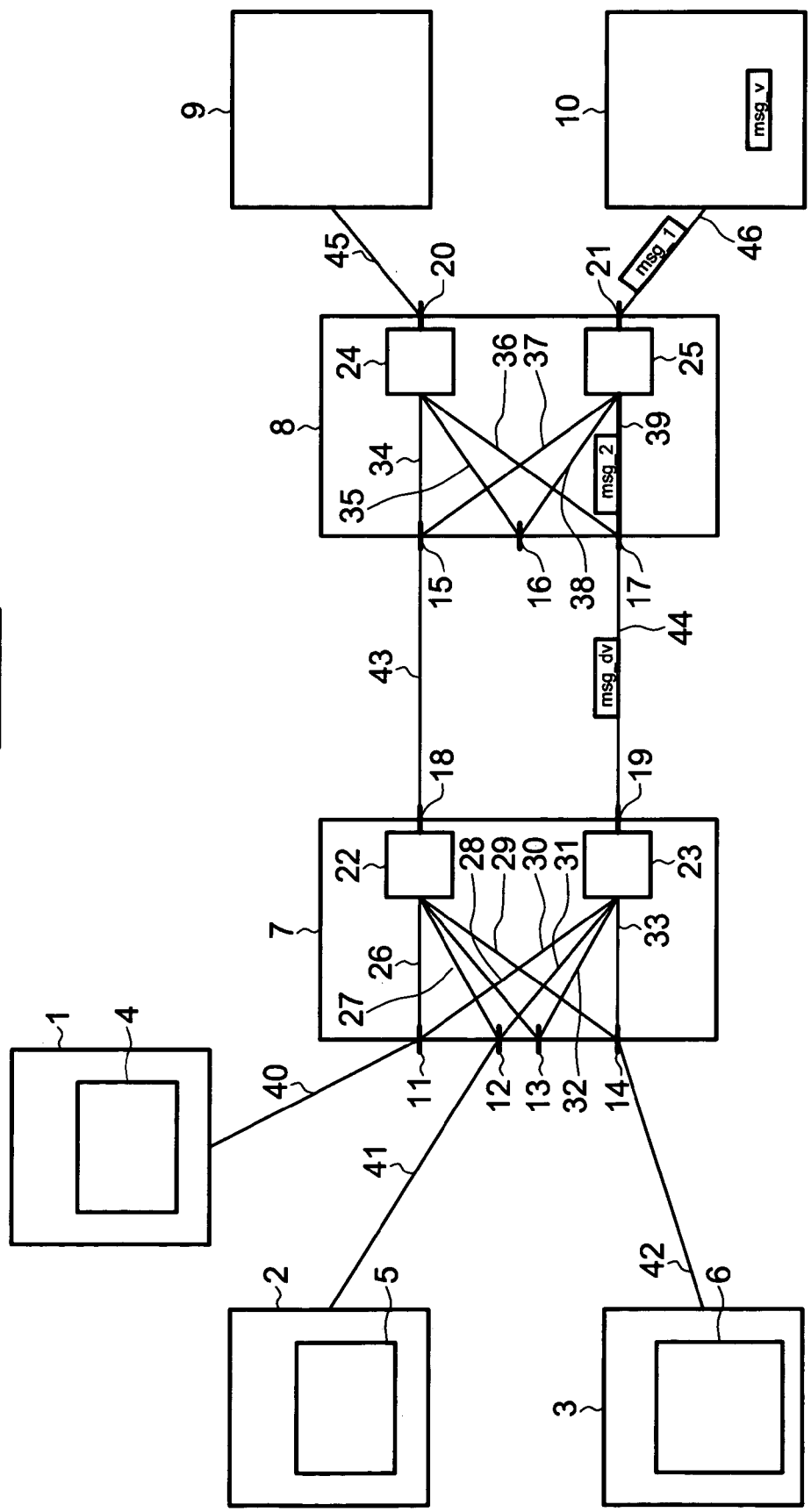

In FIG. 8, the locking message is received by the destination agent 10, the first command message msg_1 is transmitted by the connection 46, the second command message msg_2 is transmitted by the connection 39 to the output 21 and the unlocking message msg_dv is transmitted by the connection 44. The connection 33 is again shown in fine line, since the output 19 is no longer locked onto the input 14.

Figure 9:
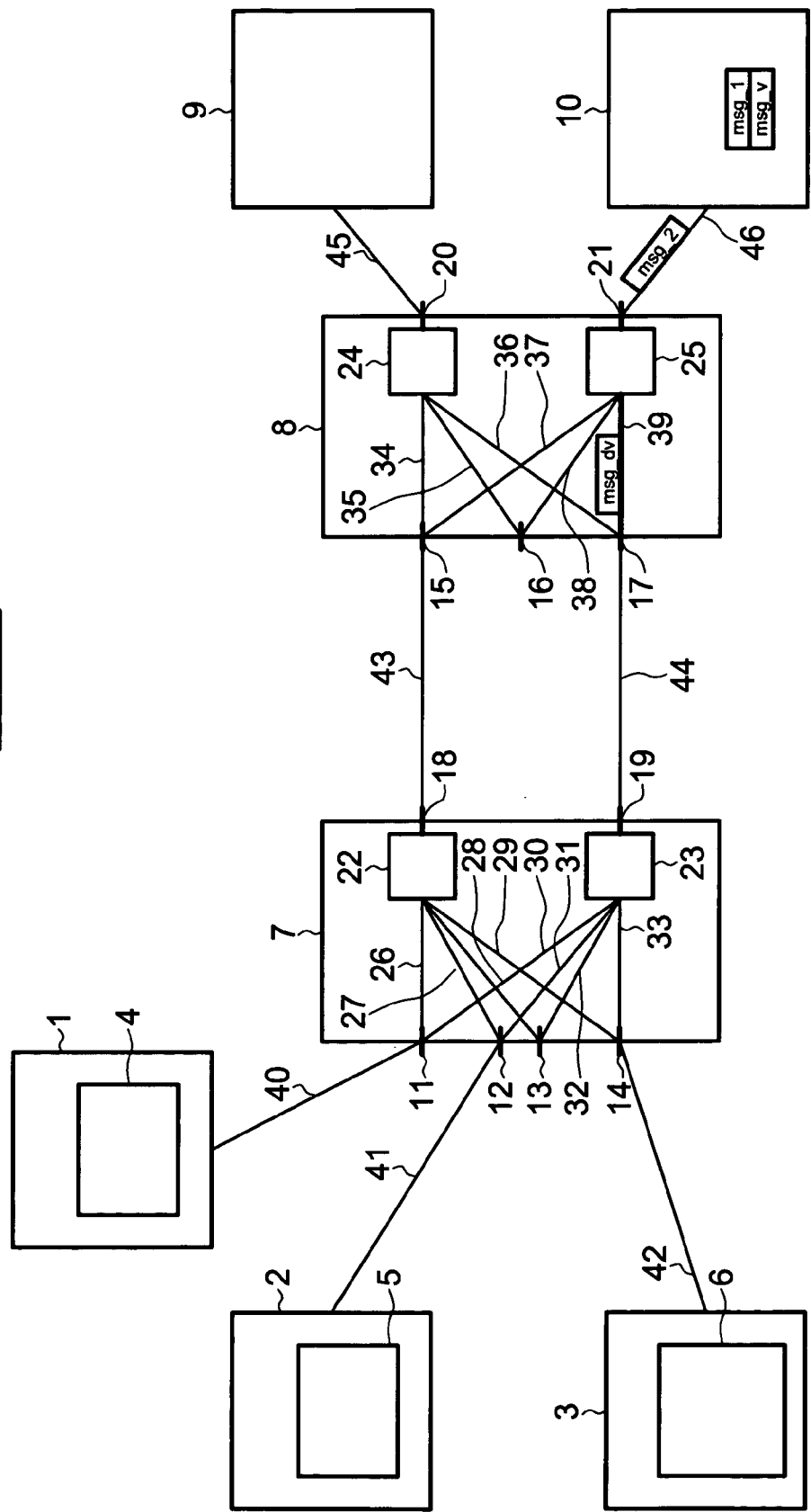

In FIG. 9, the destination agent 10 has received the first command message msg_1 and the second command message msg_2 is transmitted by the connection 46. The unlocking message msg_dv is transmitted by the connection 39. The authorization module 25 recognizes the unlocking operation code in the unlocking message msg_dv and therefore ends the locking of the output 21 onto the input 17.

Figure 10:
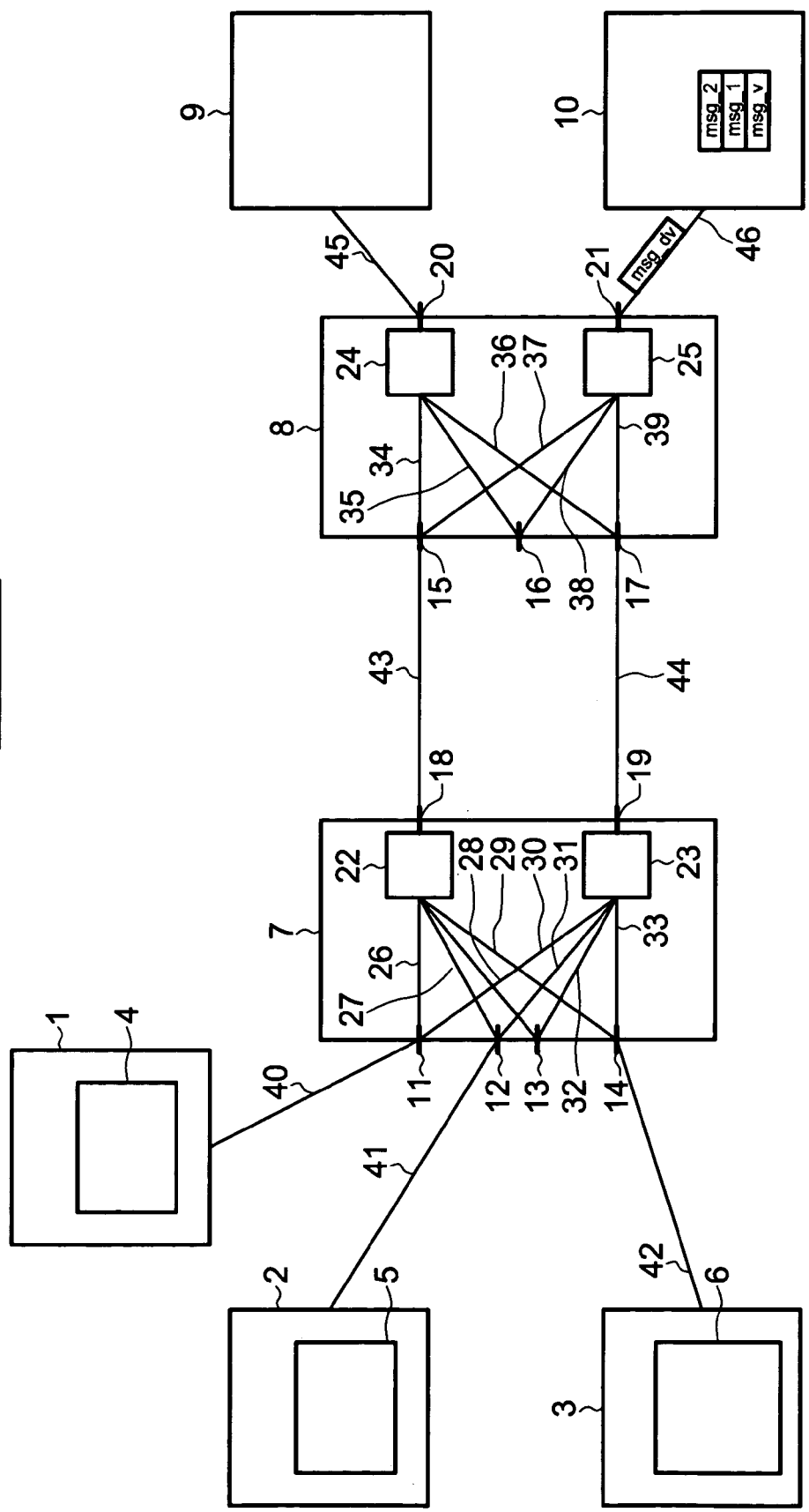

In FIG. 10, the destination agent 10 has also received the second command message msg-_2 and the unlocking message msg_dv is transmitted by the connection 46.

Figure 11:
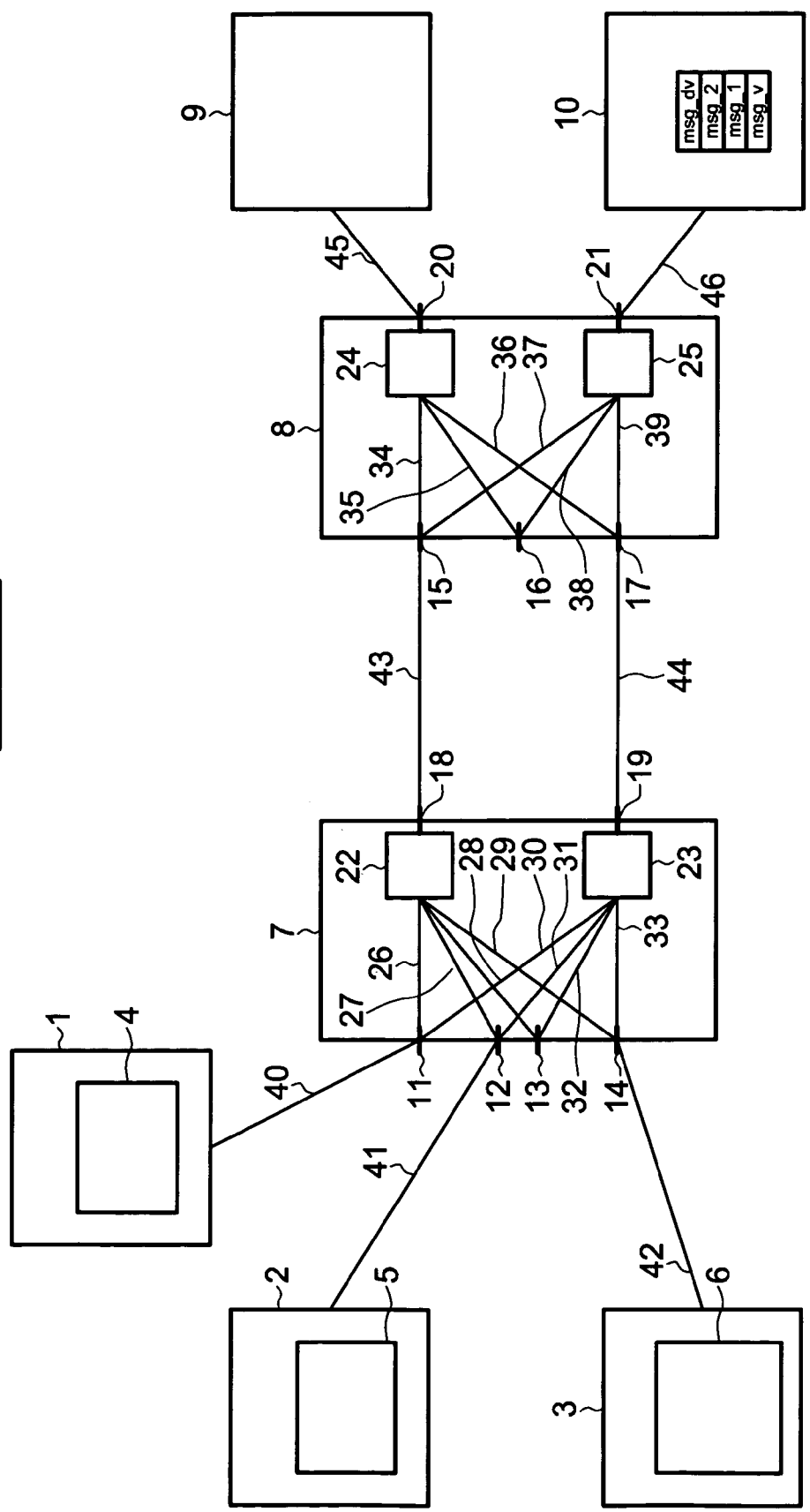

Finally, FIG. 11 shows the end of this example of transmission of an atomic sequence, or exclusive access sequence, the destination agent 10 having received the end of exclusive authorization message msg_dv, and therefore the whole of the said sequence. The connection 39 is once again shown in fine line, since the output 21 is no longer locked onto the input 17.

The transmission of the indivisible sequence has been carried out correctly without any other message being able to become inserted in the said sequence received by the target agent 10.

In order to optimize the use of the bandwidth, the operation codes of the locking and unlocking messages can respectively form part of a command.

It is also possible, in another embodiment, not to put the unlocking message msg_dv at the end of an indivisible sequence of messages, but to add, in the locking message msg_v of the indivisible sequence, the number of messages in the indivisible sequence of messages. The authorization means of the system are then capable of managing the number of messages in the indivisible sequence remaining to be transferred.

Another implementation of the invention is not to create an indivisible sequence of messages starting with a locking message, nor terminating it with an unlocking message, but to put in each message of the indivisible sequence information, for example one bit, indicating if the message is or is not linked in an indivisible manner to the following message. The locking of an output of a transmission agent will then take place when a message indicating that it is linked in an indivisible manner to the following message arrives at that transmission agent and is detected by the authorization module of an output of the transmission agent. The unlocking of this output from this input is then carried out as soon as the last message of the indivisible sequence is detected by the authorization module of the output, the last message of an indivisible sequence of messages indicating that it is not linked in an indivisible manner to the following message.

The invention therefore makes it possible to manage, at low cost, the transmission of indivisible sequences of messages, from an initiating agent to a destination agent by locking outputs onto one of the inputs of successive transmission agents between the initiating agent and the destination agent, without modifying the behaviour of the other inputs and output of these transmission agents.

The invention offers an advantage of locked data busses, that is to say one whose transactions or indivisible sequences of messages are locked, without having the disadvantage of having to inhibit the functioning of the unlocked inputs and outputs.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description to the invention. Changes may be made in the elements described herein without departing from the spirit and scope of the invention as described in the following claims. In addition, it is to be understood that features described herein independently may, in certain embodiments, be combined.

What is claimed is:

1. A method of transmitting a sequence of messages in a point-to-point interconnection network comprising message initiating agents, message destination agents and message transmission agents, wherein an indivisible sequence of messages generated by an initiating agent and destined for a destination agent starts with a locking message comprising an address identifying the destination agent, and an operation code containing information indicating that the sequence is indivisible, wherein, during a transmission of an indivisible sequence of messages from an initiating agent to a destination agent, an output of a message transmission agent is locked onto an input of the message transmission agent, the other inputs of said transmission agent being able to transmit messages to other outputs of the said message transmission agent, and wherein said indivisible sequence of messages is terminated by an unlocking message comprising the address identifying the destination agent and the operation code interpreted as an unlocking code for ending the locking of the output of the message transmission agent onto the input of the message transmission agent.

2. The method according to claim 1, wherein the said operation code is interpreted as a locking code and is also interpreted as a command.

3. The method according to claim 1, wherein the locking message propagates, to successive message transmission agents between the initiating agent and the destination agent, a locking of a specified output of each of the said successive message transmission agents onto an input of each of said successive message transmission agents through which the locking message arrived.

4. The method according to claim 3, wherein the messages of the said indivisible sequence of messages following the locking message are transmitted by the successive message transmission agents through a path that is locked the locked path preventing a message coming from another initiating agent from being inserted in the said indivisible sequence of messages.

5. The method according to claim 3, wherein the unlocking message propagates, to the successive transmission agents between the initiating agents and the destination agent, an unlocking of the successive outputs locked onto their respective input.

6. The method according to claim 3, wherein the said operation code interpreted as an unlocking code is interpreted as a command.

7. The method according to claim 4, wherein the said locking message also comprises the number of messages in the indivisible sequence of messages.

8. The method according to claim 4, wherein each message of an indivisible sequence of messages generated by an initiating agent and destined for a destination agent comprises information indicating that it is linked in an indivisible manner with the following message, the first message in the said sequence furthermore comprising an address identifying the destination agent.

9. The method according to claim 1, wherein:
on the successive message transmission agents between the initiating agent and the destination agent, a specified output of each of the said successive message transmission agents onto the input through which has arrived a first message of the indivisible sequence comprising information that it is linked in an indivisible manner with the following message, is locked;
the following messages of the indivisible sequence are transmitted, through the locked path; and
the said locked outputs are unlocked on transmission of a last message of the indivisible sequence, which contains information indicating that it is not linked in an indivisible manner with the following message.

10. A system for transmitting a sequence of messages in a point-to-point interconnection network comprising message initiating agents, message destination agents and message transmission agents, wherein an indivisible sequence of messages generated by an initiating agent and destined for a destination agent starts with a locking message comprising an address identifying the destination agent, and an operation code containing information indicating that the sequence is indivisible, wherein said indivisible sequence of messages is terminated by an unlocking message comprising the address identifying the destination agent and the operation code interpreted as an unlocking code, wherein it comprises a transmission agent which comprises at least one output comprising a means of authorization, said means of authorization recognizes the locking operation code and then locks the said output onto an input of the transmission agent, the other inputs of the said transmission agent being able to transmit messages to the other outputs of the said transmission agent, and to unlock the said locked output, and said means of authorization recognizes the unlocking code in the unlocking message and therefore ends the locking of the output onto the input.

* * * * *

UNITED STATES PATENT AND TRADEMARK OFFICE
CERTIFICATE OF CORRECTION

PATENT NO. : 8,031,730 B2
APPLICATION NO. : 10/988831
DATED : October 4, 2011
INVENTOR(S) : Cesar Douady et al.

It is certified that error appears in the above-identified patent and that said Letters Patent is hereby corrected as shown below:

In the Claims

In Claim 2, Line 62, Column 7, delete "wherein the" and insert -- wherein --, therefor.

In Claim 8, Line 23, Column 8, delete "4" and insert -- 1 --, therefor.

Signed and Sealed this
Twenty-third Day of April, 2013

Teresa Stanek Rea
*Acting Director of the United States Patent and Trademark Office*